Jan. 26, 1965  A. N. BLAND ETAL  3,167,164
CLUTCHES
Filed July 30, 1962  2 Sheets-Sheet 1

Inventors
Albert N. Bland
John Downs
By Lawrence J. Winter
ATTORNEY

Jan. 26, 1965   A. N. BLAND ETAL   3,167,164
CLUTCHES
Filed July 30, 1962   2 Sheets-Sheet 2

Inventors
Albert N. Bland
John Downs
By Lawrence J. Winter
Attorney 3,167,164
CLUTCHES
Albert N. Bland and John Downs, Leamington Spa, England, assignors to Automotive Products Company Limited, Leamington Spa, England
Filed July 30, 1962, Ser. No. 213,534
Claims priority, application Great Britain, Sept. 1, 1961, 31,561/61
4 Claims. (Cl. 192—89)

This invention relates to diaphragm spring clutches and has for its primary object to provide a construction whereby the effort required to effect clutch disengagement is reduced so that clutch operation is facilitated.

In accordance with the invention the spring fulcrum of the diaphragm spring is provided at or adjacent a peripheral edge thereof, the spring force being transmitted to the pressure plate of the clutch about a pitch circle radially inwards of the said peripheral edge.

A diaphragm spring clutch comprises for example, a driving member, a pressure plate on one side of the driving member, and a driven member between the pressure plate and the driving member, a thrust plate on the side of the driving member opposite to the pressure plate and connected thereto so as to be jointly rotatable and axially movable therewith and a diaphragm spring disposed between the thrust plate and driving member, the diaphragm spring co-operating with the driving member to provide at or adjacent the peripheral edge of the diaphragm, a spring fulcrum and co-operating with the thrust plate so that the spring force is transmitted to the pressure plate about a pitch circle radially inwards of the said peripheral edge.

A diaphragm spring clutch incorporating the invention will now be described by way of example by aid of the accompanying diagrammatic drawings in which.

Figure 1:
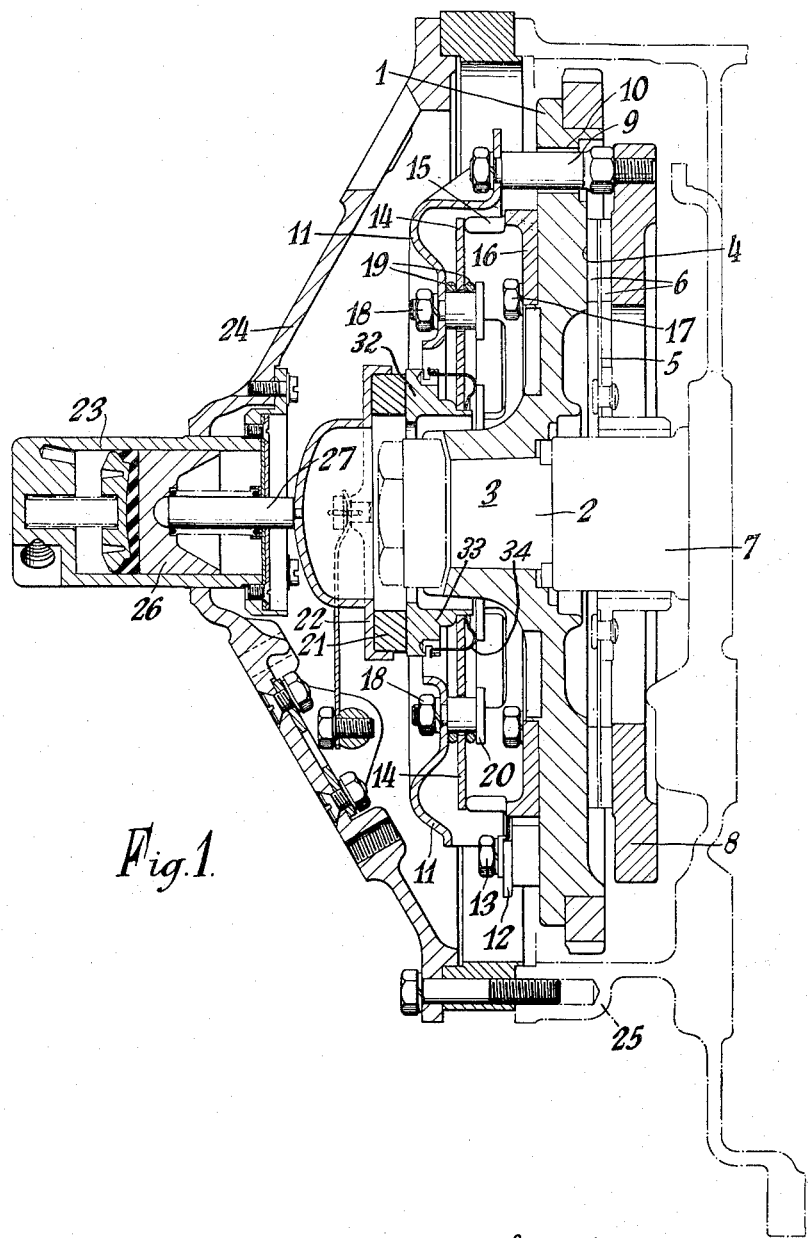
FIGURE 1 is a section on the line I—I of FIGURE 2.
Figure 2:
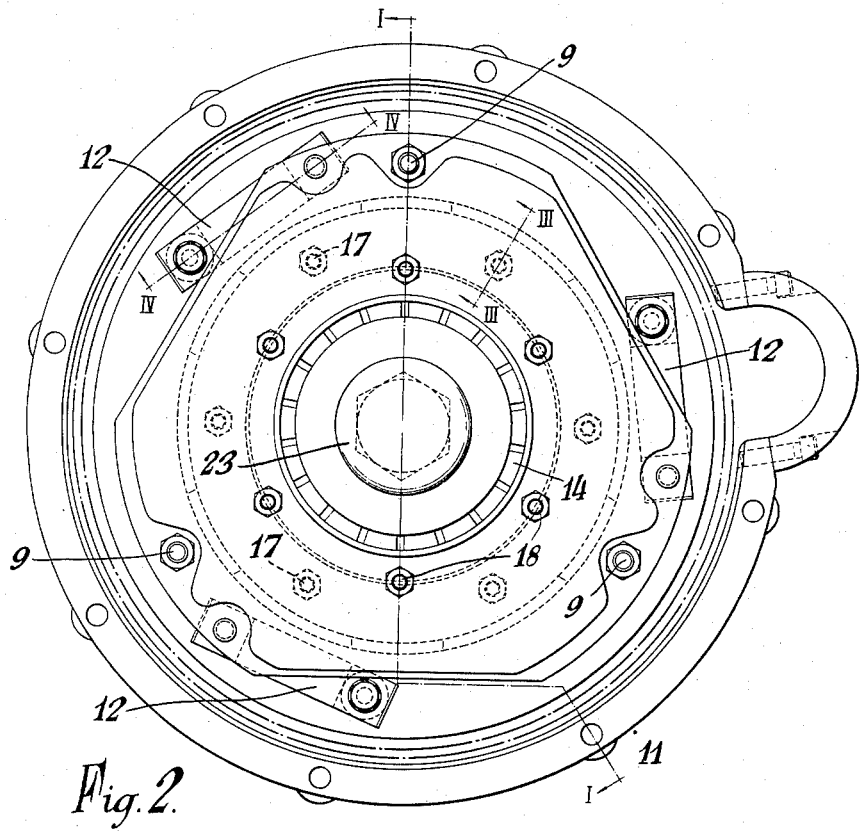
FIGURE 2 is a view of the clutch as seen from the left of FIGURE 1.
Figure 3:
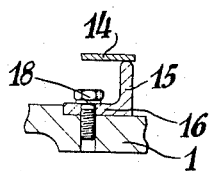
FIGURE 3 is a fragmentary section on the line III—III of FIGURE 2.
Figure 4:
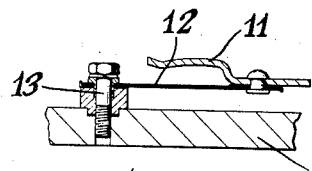
FIGURE 4 is a further fragmentary section on the line IV—IV of FIGURE 2.

Referring to the drawings, a flywheel 1 adapted for mounting on the tapered end 2 of the crank-shaft 3 of an internal combustion engine is provided with a flat annular face 4 on the side facing towards the engine, and a driven clutch plate 5, provided with the usual friction facings 6, is mounted on splines on a tubular shaft 7 surrounding the crank-shaft, so as to be engageable with the said annular face 4. An annular pressure plate 8 lying on the side of the driven plate remote from the flywheel is connected by bolts 9, passing through clearance holes 10 in the flywheel, to a spring-loaded thrust plate 11 on the other side of the flywheel. The spring-loaded thrust plate 11 is generally triangular in shape, there being three of the bolts 9 connecting it to the pressure plate, one at each corner. The spring loaded thrust plate 11 is also connected to the flywheel by a strap drive consisting of three flexible straps 12, the straps being equally spaced from one another and secured by bolts 13 at each end thereof to the thrust plate 11 and flywheel 1 respectively.

The thrust plate 11 is spring loaded by an annular diaphragm spring 14 located between the flywheel 1 and the thrust plate 11. The outer periphery of the diaphragm spring 14 bears against lugs 15 extending outwardly from the opposite face of the flywheel, each lug being provided by one limb of an angle bracket 16 each of which is secured by its other limb, by a bolt 17 to the flywheel. The diaphragm spring 14 is secured to the thrust plate 11 by a ring of bolts 18 arranged radially inwards of the outer peripheral edge of the diaphragm spring bearing against the lugs 15 carried by the flywheel. The diaphragm spring 14 is clamped between two spacer rings 19 which embrace the bolt shanks, the spacer rings being arranged one on either side of the diaphragm spring 14, one of said rings 19 being disposed between enlarged heads 20 on the bolts and the opposite face of the diaphragm spring, the other ring 19 being disposed between the other face of the diaphragm spring 14 and the opposite face of the thrust plate 11. The inner peripheral edge of the annular central opening of spring 14 has an annular member 32 extending therethrough. Annular member 32 is provided with an annular shoulder 33 which engages the inner peripheral edge or inner circumference of spring 14. The portion of annular member 32, opposite the spring 14, is adapted to bear against thrust ring 21. A spring clip 34 with an outwardly extending bent rim is fastened through openings in annular member 32 and has its opposite end portion bearing against spring 14.

The clutch shown in the drawing is adapted for operation by fluid pressure, for example hydraulically. The clutch operating mechanism comprises a thrust ring 21 disposed in the central opening of the annular diaphragm spring 14, a thrust bearing 22 being arranged concentrically with the thrust ring. The thrust bearing 22 and ring 21 are axially displaceable from a retracted position, to effect clutch disengagement, by the admission of pressure fluid to a hydraulic or other fluid pressure cylinder 23 carried by a cover 24 enclosing the thrust plate and secured to a housing 25 surrounding the clutch. The piston 26 of the cylinder is operatively coupled to the thrust bearing 22 through a plunger 27.

In operation, with the thrust ring 21 and thrust bearing 22 in the retracted position, the annular diaphragm spring 14 acts through the thrust plate 11 and the bolts 9 connecting it to the pressure plate 8 to pull the latter towards the flywheel and hold the driven member, clutch plate 5, in contact with the flywheel face. To effect clutch disengagement, hydraulic or other fluid under pressure is admitted to the cylinder 23, the resulting axial displacement of the thrust ring 21 and thrust bearing 22 from the retracted position, in a direction towards the flywheel 1 causes deflection of the annular diaphragm spring 14, with corresponding movement of the thrust plate 11 so that the pressure plate 8 is moved away from the flywheel, and the clutch disengaged. Clutch re-engagement is obtained by releasing the pressure fluid from the cylinder so permitting the diaphragm spring 14 to again act on the thrust plate 11 to pull the pressure plate 8 towards the flywheel.

With the clutch of the present invention, due to the relative positions of the spring fulcrum of the diaphragm spring 14, and the point at which the spring force is transmitted to the pressure plate, a leverage can be obtained which is such that the effort required to overcome the spring action to effect clutch disengagement can be considerably reduced in relation to conventional clutch constructions or constructions proposed hitherto.

We claim:

1. A diaphragm spring clutch device comprising a rotatable driving member, a drive pressure clutch plate disposed on one side of said driving member, and a driven clutch plate disposed between said pressure clutch plate and driving member, an annular thrust plate disposed on the opposite side of said driving member, means connecting said thrust plate to said rotatable driving member for rotation therewith and to said pressure clutch plate for axial movement therewith, means for securing a diaphragm spring to said annular thrust plate, an annular diaphragm spring secured to said thrust plate, said spring having its inner peripheral edge fixedly secured to said securing means and its outer peripheral edge freely disposed, and lug means fixed on said driving member for engaging the outer peripheral edge only of said spring for moving said thrust plate and clutch drive plate in one direction to engage said clutch pressure plate with said driven clutch plate, and cylinder and piston means for moving said thrust plate in the opposite direction to disengage said driven and drive clutch plates.

2. The device of claim 1 wherein said diaphragm spring is disposed between said thrust plate and driving member and has its outer peripheral edge encircled by said thrust plate.

3. The device of claim 2 wherein said spring has its outer peripheral edge disposed radially inwardly of the outer portion of the pressure clutch plate to provide a fulcrum effect in which the force of said spring is transmitted to the pressure plate about a pitch circle radially inwardly of the peripheral edge of the pressure plate.

4. The clutch device of claim 1 wherein the thrust plate is connected to the driving member by a strap drive.

References Cited by the Examiner
UNITED STATES PATENTS

| 2,037,451 | 4/36 | Beringer | 192—89 X |
| 2,211,191 | 8/40 | Wolfram | 192—91 |
| 2,770,341 | 11/56 | Wobrock | 192—89 X |
| 2,890,773 | 6/59 | Martindell | 192—89 X |

FOREIGN PATENTS 599,330   6/60   Canada.

DAVID J. WILLIAMOWSKY, *Primary Examiner.*

ROBERT C. RIORDON, *Examiner.*